DAVID R. SMITH.
Improvement in Endless Rope-Way.
No. 124,391. Patented March 5, 1872.
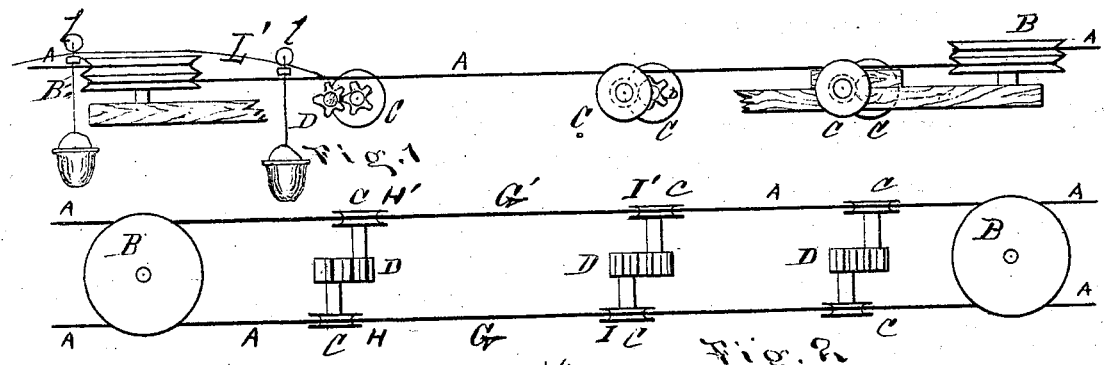
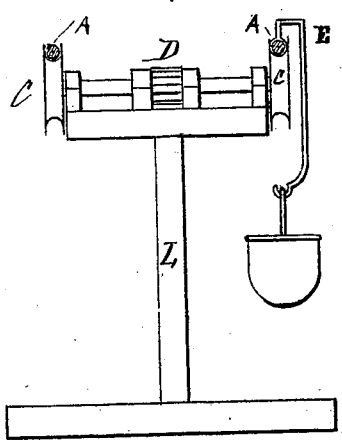
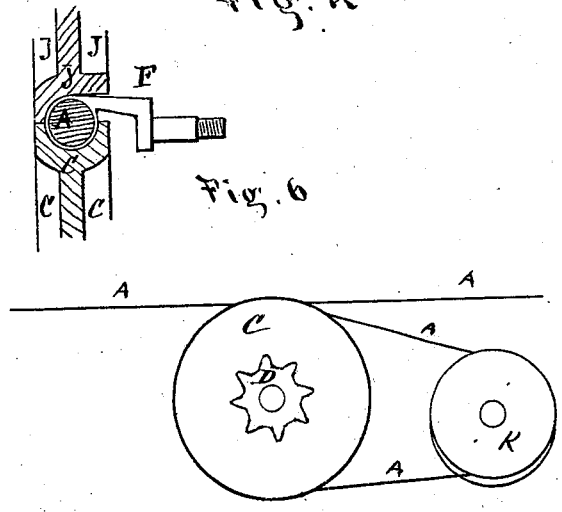
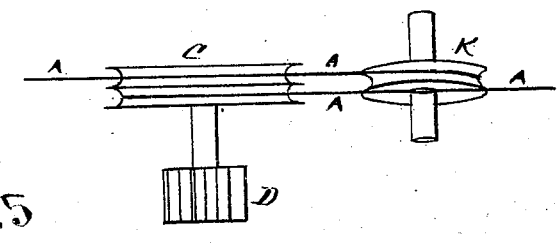
Witnesses
Inventor
David R. Smith

124,391

UNITED STATES PATENT OFFICE.

DAVID R. SMITH, OF SAN FRANCISCO, CALIFORNIA, ASSIGNOR TO ANDREW S. HALLIDIE, OF SAME PLACE.

IMPROVEMENT IN ENDLESS-ROPE WAYS.

Specification forming part of Letters Patent No. 124,391, dated March 5, 1872.

SPECIFICATION.

*To all whom it may concern:*

Be it known that I, DAVID R. SMITH, of San Francisco, in the county of San Francisco, and in the State of California, have invented an Improved Endless-Rope Way, of which the following is a specification, reference being had to the accompanying drawing.

An endless rope, preferably of wire, passing around suitable end pulleys, and over or around suitable bearing-pulleys, may be used for the transportation of weights contained in sacks, or buckets, or cars attached to or suspended from the rope, or contained in cars running upon a double line of rails or double-track tram-way or railway, and attached to the rope. The weight of the buckets or cars should be equally distributed throughout the length of the rope, so that the united weight of cars or bucket and rope of any given part of one side of the line would be exactly balanced by the part of equal length immediately opposite to it, whatever may be the nature of the ground over which the line runs. Then, if the buckets or cars are all loaded equally, the loads will also balance each other, and the only resistance to motion will arise from the friction of the parts. If the load or any part of it is discharged at a point lower than that at which it is received, the unbalanced weight of the descending load will furnish a part or all the power required to produce motion. The more uneven the ground, the better for obtaining power in this manner, for earth or water may be loaded at or near the top of the hills or mountains, and discharged in the valleys, and all the power required may under favorable circumstances be thus cheaply obtained.

In lines heretofore constructed, all that part of the rope, with its buckets, cars, and load attached, moving in one direction having no connection with the parts moving in the opposite direction, except around the end pulleys, a very strong rope has been required of sufficient strength to sustain the unbalanced and accumulated strain due to the weight of one-half of the entire line, when such line has had a grade descending for its entire length in one direction, and, as the required size of the rope increases rapidly with every addition to the length, the practical limit of a continuous line constructed in this manner is soon reached.

The object of my invention is to render practicable the construction of lines of great length, or of indefinite or of any required length, with any given size of rope, over any kind of country, with heavy or light grades. This I accomplish by connecting at short distances, by gearing or pulleys or other suitable mechanical devices, the parts moving in one direction with the parts moving in the opposite direction, in such a manner that the power or strain resulting from the weight of the moving parts on either side, and between the points of connection, will be communicated, through or around said gearing or pulleys or other suitable mechanical devices, to the part of the rope immediately opposite and between the same or adjacent points of connection.

The drawing, Figures 1, 2, 3, 4, 5, and 6, represents details of endless-rope way illustrating my invention.

Each part is distinguished by the same letter whenever it appears in the several figures.

A is the endless rope. B are the double horizontal bearing-pulleys. C are the vertical bearing-pulleys. The pulleys C are in pairs, connected by spur-wheels D. If the rope-way is elevated upon posts L, and the entire weight of the cars, buckets or sacks, and load rests upon the rope, and the entire power is to be obtained from the weight of the descending loads, a hanger, E or F, permanently attached to the rope, may be used, and, whatever the length of the line may be, only one rope will be required, because the entire power or moving force resulting from the weight of any part, G, of the rope and its load between any two bearing-pulleys, H I, will be communicated to those bearing-pulleys by the friction of the rope, and transmitted through the spur-wheels D to the opposite wheels H′ I′, and thence to the part G′ of the rope, propelling the part G′ in the direction opposite to that in which the part G moves. If the proposed line should pass for a great distance over level ground, first economy would suggest, and at last necessity would compel, the application of some motive-power other than gravity, which power may be applied to the axles of the pulleys C; and if the hanger F is employed, the additional friction required may be obtained by the pressure of a pulley, J, placed above the rope. When saddles or other devices are employed that are attached to and detached from the rope automatically, the required friction may be obtained by the employment of a small pulley, K, with its axis inclined to the axis of the bearing-pulley C, to which the power is applied, as illustrated in Figs. 4 and 5. When the saddle or automatic hanger is used, another form or modification of my invention may be employed—to wit, instead of the single endless rope extending the entire length of the line, a great number of ropes may be employed, and, instead of transmitting the power through the spur-wheels C from one side of the line to the other, it may be transmitted around the double-grooved horizontal pulleys B. As power can be applied with facility to the axles of the pulleys B, and as they are exceedingly well adapted to sustain and distribute the strain on a steep hill-side or long incline, it will be frequently found advisable to employ both the above-described forms of my invention in the same line of elevated way. When a loaded bucket reaches one of the double-grooved wheels B, it (the load) is transferred from the rope upon which it reaches the wheel to the rope upon which it is to leave the wheel by means of a switch, L', (see Fig. 1,) a saddle or an automatically-detachable hanger being used, the momentum of the load being sufficient to propel the saddle or hanger over the switch upon a friction-wheel, l; or any other approved or desired method of switching or transferring may be employed. When wheel K is employed in combination with wheel C and the saddles, a switch must be used substantially as with the double-grooved wheel B. If the cars, instead of being suspended from the rope, run upon a rail-track or double tram-way, the weight of the rope on the top of the pulleys C would not be sufficient for the purposes of my invention; and that friction may be increased by means of pulleys K, or resort may be had to the double-grooved horizontal pulleys B.

What I claim as my invention is—

1. In an endless-rope way adapted to transport freight in opposite directions over one and the same continuous wire or rope, I claim the herein-described method of transferring the strain or tension from a portion of the rope or wire running in one direction to a portion of the same rope or wire moving in another direction, substantially as and for the purpose set forth.

2. The combination of the endless rope A with the pulleys C and K, when the pulleys C are connected by gearing, in a manner substantially as described, and for the purposes set forth.

3. The combination of the endless ropes A with the double-grooved pulleys B and switches L', substantially as described, and for the purposes set forth.

4. The combination of the endless ropes A with the double-grooved pulleys B and the bearing-pulleys C, substantially as and for the purposes set forth.

5. The combination of the endless ropes A with the double-grooved pulleys B and the pulleys C and K, when said pulleys C are connected by gearing, in a manner substantially as described and herein set forth.

In testimony whereof I have hereunto set my hand this 26th day of April, A. D. 1871.

DAVID R. SMITH.

Witnesses:
GEO. P. COLEMAN,
W. B. HAMMOND.